(12) United States Patent
Shinkai et al.

(10) Patent No.: US 10,916,145 B2
(45) Date of Patent: Feb. 9, 2021

(54) WORK VEHICLE COORDINATION SYSTEM AND WORK VEHICLE

(71) Applicant: KUBOTA CORPORATION, Osaka (JP)

(72) Inventors: Atsushi Shinkai, Sakai (JP); Kotaro Yamaguchi, Amagasaki (JP)

(73) Assignee: KUBOTA CORPORATION, Osaka (JP)

(*) Notice: Subject to any disclaimer, the term of this patent is extended or adjusted under 35 U.S.C. 154(b) by 95 days.

(21) Appl. No.: 16/098,558

(22) PCT Filed: Dec. 8, 2016

(86) PCT No.: PCT/JP2016/086596
§ 371 (c)(1),
(2) Date: Nov. 2, 2018

(87) PCT Pub. No.: WO2017/208484
PCT Pub. Date: Dec. 7, 2017

(65) Prior Publication Data
US 2019/0304311 A1  Oct. 3, 2019

(30) Foreign Application Priority Data
Jun. 1, 2016 (JP) ................. 2016-110340

(51) Int. Cl.
*G08G 1/00* (2006.01)
*A01B 69/00* (2006.01)
(Continued)

(52) U.S. Cl.
CPC ............. *G08G 1/22* (2013.01); *A01B 69/004* (2013.01); *A01B 69/008* (2013.01); *A01B 76/00* (2013.01);
(Continued)

(58) Field of Classification Search
None
See application file for complete search history.

(56) References Cited

U.S. PATENT DOCUMENTS

2014/0215984 A1    8/2014  Bischoff
2015/0348419 A1*  12/2015  Matthews .............. A01B 79/02
                                                                701/117

(Continued)

FOREIGN PATENT DOCUMENTS

JP          7-200991 A      8/1995
JP       2014-178759 A      9/2014
(Continued)

*Primary Examiner* — Adam D Tissot
(74) *Attorney, Agent, or Firm* — Birch, Stewart, Kolasch & Birch, LLP

(57) ABSTRACT

A work vehicle coordination system includes a traveling work parameter setting section (41) included in each work vehicle for setting a traveling work parameter to define a traveling work of each work vehicle, a communication processing section (71, 72) for effecting data communication between/among the plurality of work vehicles, a traveling work parameter acquisition section (42) for acquiring the traveling work parameter set in each work vehicle, a difference data generation section (43) for generating difference data indicative of a difference between/among the traveling work parameters set in the respective work vehicles, and an informing section (56) for informing the difference data.

10 Claims, 6 Drawing Sheets

(51) Int. Cl.
  *G01C 21/00* (2006.01)
  *A01B 76/00* (2006.01)
  *G05D 1/02* (2020.01)
  *G08G 1/09* (2006.01)
  *A01B 69/04* (2006.01)

(52) U.S. Cl.
  CPC ......... *G05D 1/0291* (2013.01); *G05D 1/0295* (2013.01); *G05D 1/0297* (2013.01); *G08G 1/00* (2013.01); *G08G 1/09* (2013.01); *G08G 1/20* (2013.01); *G05D 2201/0201* (2013.01)

(56) References Cited

U.S. PATENT DOCUMENTS

| | | |
|---|---|---|
| 2015/0352724 A1 | 12/2015 | Nobuhara et al. |
| 2016/0120095 A1* | 5/2016 | Fujimoto ............. G05D 1/0219 701/24 |
| 2016/0174453 A1* | 6/2016 | Matsuzaki ............. A01B 69/00 701/2 |
| 2017/0160748 A1 | 6/2017 | Nakagawaa et al. |

FOREIGN PATENT DOCUMENTS

| | | |
|---|---|---|
| JP | 2015-188351 A | 11/2015 |
| JP | 2015-231656 A | 12/2015 |
| JP | 2016-13065 A | 1/2016 |
| JP | 2016-31649 A | 3/2016 |

* cited by examiner (RWP: traveling work parameter)

WORK VEHICLE COORDINATION SYSTEM AND WORK VEHICLE

TECHNICAL FIELD

The present invention relates to a work vehicle coordination system configured to manage coordinated traveling work carried out by a plurality of work vehicles working in coordination in a work field.

BACKGROUND ART

Patent Literature 1 discloses a work vehicle coordination system in which a ground work is carried out by a master work vehicle and an unmanned slave work vehicle configured to follow suit with the master work vehicle. The system includes a master position detection module for detecting a master position which is the position of the master work vehicle, a slave position detection module for detecting a slave position which is the position of the slave work vehicle, a slave traveling target calculation section for calculating target traveling position for the slave work vehicle based on a traveling path of the master work vehicle, a master parameter production section configured to produce a master parameter by linking a master work driving parameter relating to a work driving carried out by the master work vehicle with the master position, a slave parameter production section configured to produce a slave parameter for the slave work vehicle linked to a corresponding target traveling position of the slave work vehicle based on the master work driving parameter, and a maneuvering control section for causing the slave work vehicle to travel unmanned based on the slave position, the target traveling position and the slave work driving parameter. The master work driving parameter relating to a work driving carried out by the master work vehicle is produced in linkage with the position of the master work vehicle; and also, based on this master work driving parameter, there is produced the slave work driving parameter for the slave work vehicle linked to a target traveling position of the slave work vehicle which corresponds to the position of the master work vehicle. With this, the slave work vehicle can carry out a work driving which faithfully follows suit with the work driving of the master work vehicle, based on the work driving parameter, the slave position and the target traveling position.

PRIOR ART DOCUMENT

Patent Literature

Patent Literature 1: Japanese Unexamined Patent Application Publication No. 2015-188351 (JP 2015-188351 A)

SUMMARY OF THE INVENTION

Object to be Achieved by the Invention

With an agricultural work vehicle such as a cultivator tractor, a rice planter, etc. for effecting a field work, operations such as a turning operation, acceleration/deceleration operations, elevating/lowering operations of a mounted implement (e.g. a rotary cultivator and a seedling plating device), ON/OFF operations of a transmission clutch, etc. are effected in the course of traveling. In addition, before start of traveling work, it is necessary to effect initial settings of various settings (parameter settings) that define the traveling work. These various kinds of settings include e.g. a vehicle speed, an engine rotational speed, a posture and a position of the mounted implement, a steering angle of steering wheels at time of turning, etc. If such various kinds of settings differ among/between work vehicles engaged in coordinated work, there will occur a problem that desired traveling work results cannot be obtained. In case the work vehicle specifications and the implement specifications differ among/between work vehicles engaged in coordinated work, it is also necessary to effect the settings in conformity for each of the work vehicles engaged in coordinated work in order to obtain as equal as possible work results respectively therefrom. However, even if such initial settings have been once effected, the settings can be subjected to some unexpected change subsequently. Therefore, it is not easy to keep various kinds of settings in agreement with each other among/between work vehicles engaged in coordinated work. In particular, when traveling work is carried out automatically, it is necessary to manually check the various settings for all the work vehicles at time of start of work, thus being troublesome.

In view of the state of the above described above, there remains a need for a technique that allows easy and reliable setting and subsequent maintaining of traveling work parameters that are to define traveling works of respective work vehicles in a coordinated traveling work carried out by a plurality of work vehicles in coordination in a work field.

Solution to Achieve the Object

The present invention provides:

A work vehicle coordination system configured to manage a coordinated traveling work carried out by a plurality of work vehicles in coordination in a work field, the system comprising:

a traveling work parameter setting section included in each work vehicle for setting a traveling work parameter to define a traveling work of each work vehicle;

a communication processing section for effecting data communication between/among the plurality of work vehicles;

a traveling work parameter acquisition section for acquiring the traveling work parameter set in each work vehicle;

a difference data generation section for generating difference data indicative of a difference between/among the traveling work parameters set in the respective work vehicles; and an informing section for informing the difference data.

According to the above-described arrangement, the traveling work parameter acquisition section acquires the traveling work parameters set in the respective work vehicles via data communication. If there exists an difference in the acquired traveling work parameters of the respective work vehicles, difference data indicative of such difference will be generated by the difference data generation section. For example, if a difference exists in set parameters relating to the vehicle speed in a constant vehicle speed traveling work or the position (posture) of the mounted implement, data that specifies such setting parameters will be generated as the "difference data". In this, if each traveling work parameter has a certain reference value, data that specifies a work vehicle in which a value exceeding an allowable range from such reference value and data that specifies such traveling work parameter will be generated in correlation with each other as the "difference data". Such reference value can be sent to the difference data generation section from e.g. a management center via data communication. Further, in case the plurality of work vehicles are divided into a master work vehicle and slave work vehicles to function, respective traveling work parameters set in the traveling work parameter setting section of the master work vehicle can be used as respective "reference values". When the generated difference data is informed by the informing section, the traveling work parameter which is set to a value inappropriate for the coordinated traveling work will be corrected to conform with the other work vehicles.

Each work vehicle managed by the above-described work vehicle coordination system comprises basically a vehicle body, and a traveling mechanism and a utility implement that are mounted on this vehicle body. The traveling mechanism includes an engine, a transmission and wheels. Therefore, the traveling work parameters to be set can be divided into traveling system parameters and working system parameters. The traveling system parameters include an engine rotational speed, a speed position, a vehicle speed, a steering angle for turning, etc. The working system parameters include a ground position, a posture and a working width of the implement, etc.

In case the informing section informs the difference data alone, this will only urge a driver or a managing person to correct the traveling work data, so that a burden placed on the driver or the managing person will be considerable. According to one preferred embodiment of the present invention, therefore, the system further comprises a conforming data generation section for generating conforming data for conforming the difference in the traveling work parameters of the respective work vehicles, the subject traveling work data being corrected based on the conforming data. With this arrangement, self vehicle conforming data for conforming the traveling work data difference of the respective work vehicle will be generated based on the difference data. Then, based on the self vehicle conforming data, the erroneously set traveling work data will be corrected. Thus, the burden on the driver or the managing person may be alleviated. At time of generation of this self vehicle conforming data too, the traveling work data of a slave work vehicle may be conformed with the traveling work data set in the master work vehicle or may be conformed with a reference value. Further, if there exists a difference in the traveling work specifications among the work vehicles, the self vehicle conforming data will be generated with taking such difference in the traveling work specifications among the work vehicles into consideration. With this, the traveling work parameters of the respective work vehicles will be conformed with each other so as to achieve as similar as possible traveling work results.

If a coordination control management process for conforming the traveling work results of the respective work vehicles with detection and correction of traveling work parameters as described above is executed not only before the traveling work results, but also after the traveling work results continuously, it is possible to resolve a problem which occurs due to a traveling work parameter change made unexpectedly during traveling work.

The present invention is directed not only to the above-described work vehicle coordination system, but also to a work vehicle to be incorporated in this work vehicle coordination system, with utilization of the technical concept of the subject work vehicle coordination system. Such work vehicle according to the present invention is a work vehicle configured to carry out a traveling work in a same work field as other work vehicle(s) which work in coordination. The present invention provides:

A work vehicle configured to carry out a traveling work in a same work field as other work vehicle which work in coordination therewith, the work vehicle comprising:

a utility implement for carrying out a ground work with traveling of the vehicle;

a traveling work parameter setting section for setting a traveling work parameter that specifies the traveling work as a self vehicle traveling work parameter;

a communication processing section for effecting data communication with the other work vehicle;

a traveling work parameter acquisition section for acquiring an other vehicle traveling work parameter which is a traveling work parameter set in the other work vehicle;

a conforming data generation section for generating self vehicle conforming data for conforming a difference between the self vehicle traveling work parameter and the other vehicle traveling work data on the side of the self vehicle and/or other vehicle conforming data for conforming the difference on the side of the other work vehicle; and a parameter correction section for correcting the self vehicle traveling work parameter based on the self vehicle conforming data.

If the above-described work vehicle coordination system includes a master work vehicle and a slave work vehicle, the work vehicle having the above-described configuration can function as the "master work vehicle". In this case, the traveling work parameter that is to specify a traveling work will be set as the "self vehicle traveling work parameter" at the traveling work parameter setting section. Normally, when a traveling work is carried out by a plurality of work vehicles working in coordination, setting of the traveling work parameter will be effected before the vehicle arrives at a predetermined work starting position in a work field as subject of contemplated work or before the work is started after such arrival. A traveling work parameter set in the other work vehicle (slave work vehicle) will be acquired as "other vehicle traveling work parameter" by the traveling work parameter acquisition section. Then, the conforming data generation section will generate conforming data for conforming a difference, if any, existing between the self vehicle traveling work parameter and the other vehicle traveling work parameter. And, such conforming data can be divided into self vehicle conforming data for conforming the self vehicle traveling work parameter and other vehicle conforming data for conforming the other vehicle traveling work parameter. Each work vehicle is equipped with a parameter correction section for correcting the self vehicle traveling work parameter based on the self vehicle conforming data. With this, the traveling work parameters of all of the work vehicles participating in this coordinated traveling work will be set same or substantially same as each other. As a result, all the work vehicles can produce substantially same traveling work results.

Basically, the other work vehicle (slave work vehicle) will be controlled in coordination to conform with the traveling work parameter set in the self work vehicle (master work vehicle). On the other hand, the traveling work parameter actually includes various kinds of parameters, so that in the case of a traveling work parameter relating to some unique specification of the work vehicle, it will be more advantageous to employ a unique setting for each work vehicle. According to one preferred embodiment of the present invention, therefore, when a difference between the self vehicle traveling work parameter and the other vehicle traveling work parameter is to be conformed, depending on a type of the traveling work parameter, selection is made possible between a self vehicle conforming priority mode which places priority on conforming on the part of the self vehicle, and an other vehicle conforming priority mode which places priority on conforming on the part of the other vehicle.

In case a work field is huge, in accordance with various positions in this work field, the slope of ground surface, hardness of the ground surface or a growth situation of agricultural produce in the case of an agricultural work field will differ significantly. Thus, it will not be reasonable to carry out the work with a same traveling work parameter for the entire area. According to one preferred embodiment of the present invention, therefore, the work vehicle further comprises: a position calculation section for calculating a self vehicle position based on positioning data from a GPS module, wherein the traveling work parameter can be set for each area of a plurality of areas which altogether constitute the work field.

The work vehicles participating in the coordinated traveling work may include a work vehicle which has a specification difference in its traveling mechanism constituted of traveling system components (an engine, a transmission, wheels) or a specification difference in its implement as an element of the working system, from other vehicle(s). Therefore, preferably, the traveling work parameters are divided into traveling parameters including a vehicle speed, an engine rotational speed, a steering angle for turn and working parameters relating to a ground position or posture, a working width of the implement, etc.

For realization of a target traveling work, the traveling work parameters will be set before the actual traveling work. However, after the traveling work is started actually, the traveling work result realized by the set traveling work parameter may deviate from the target traveling work result. And, a difference between the traveling work result expected from such set traveling work parameter and the actual traveling work result will differ for each work vehicle. Thus, preferably, correction of the traveling work parameter to resolve such difference should be effected individually. According to one preferred embodiment of the present invention, therefore, the work vehicle further comprises: an individual correction section configured to calculate an individual correction value for correcting the traveling work parameter for each individual work vehicle, based on a result of the traveling work by the set traveling work parameter. With this arrangement, in the course of a traveling work, required correction of the traveling work parameter for each individual work vehicle will be effected in order to obtain a traveling work result as close as possible to the target result. In this, preferably, this individual correction is effected in such a manner as to increase/decrease a traveling work parameter outputted to each control device while keeping the set traveling work parameter intact. This is because this individual correction will not affect the traveling work parameter set in the other work vehicle, thus being advantageous for management of the traveling work parameter managed in coordination with each other.

EMBODIMENTS FOR CARRYING OUT THE INVENTION

Figure 1:
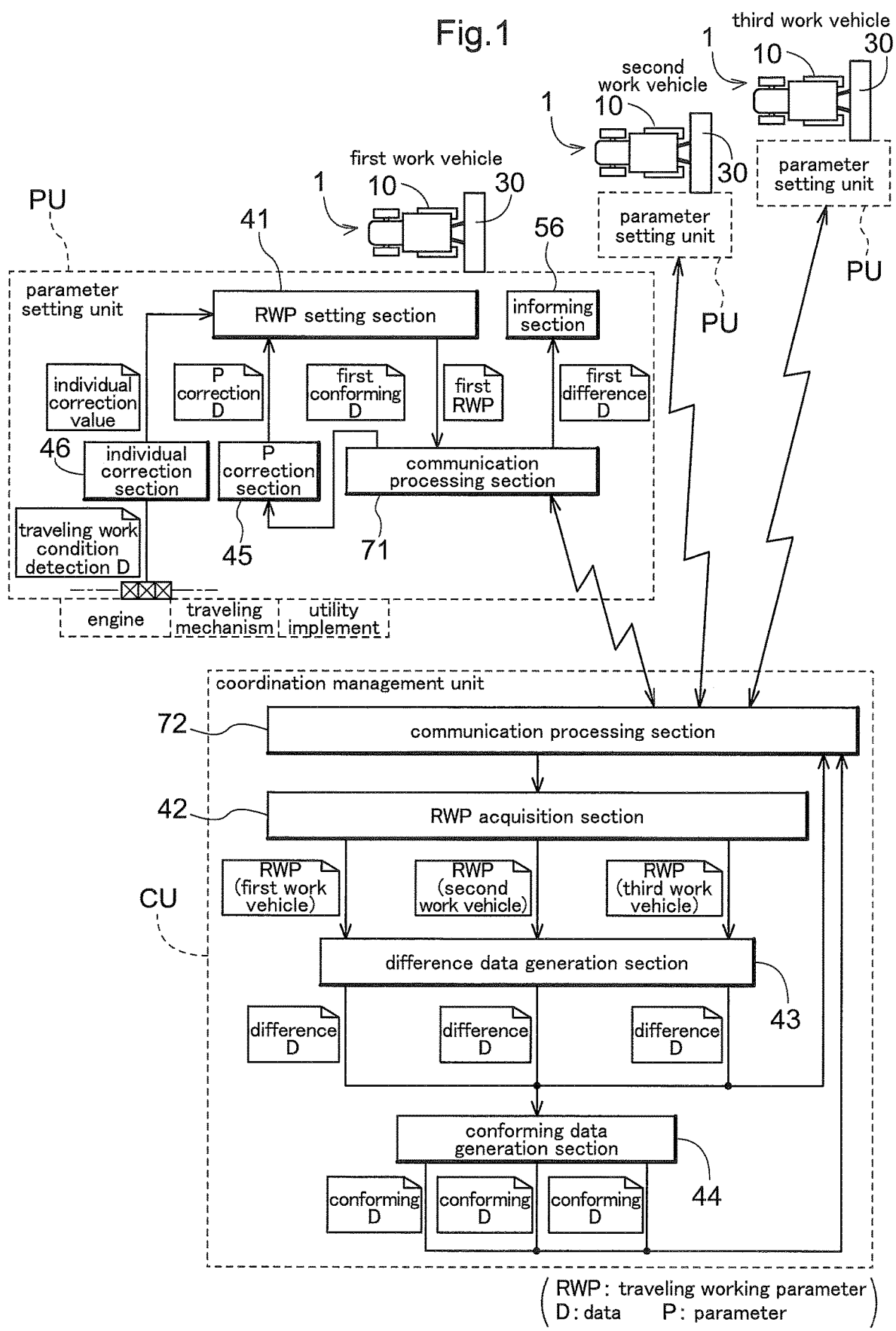
FIG. 1 is a diagram for describing a basic flow of traveling work parameter setting control in a work vehicle coordination system according to the present invention.

Before describing a specific embodiment of a work vehicle coordination system according to the present invention, a basic flow of a traveling work parameter setting control used in the work vehicle coordination system will be described. In FIG. 1, a first work vehicle, a second work vehicle and a third work vehicle are shown as a plurality of work vehicles participating in the work vehicle coordination system. Also shown therein are a parameter setting unit PU and a coordination management unit CU, each acting as a core control unit of the work vehicle coordination system. In the example shown in FIG. 1, the parameter setting unit PU is included in each work vehicle, whereas the coordination management unit CU is built in a management computer installed at a management center. In case the work vehicles includes a master work vehicle and a slave work vehicle(s), the coordination management unit CU may be incorporated in the master work vehicle instead. In the figure, it is to be noted that the traveling work parameter is represented in short by a mark: RWP, data is represented in short by a mark: D, and a parameter is represented in short by a mark: P.

In the illustrated embodiment, each work vehicle includes a vehicle body 1 mounting an engine and a traveling mechanism (transmission, steering wheels, driving wheels, etc.) 10 and a utility implement 30 mounted on the vehicle body 1. The work vehicle carries out a traveling work on a work field as the utility implement 30 is driven in association with traveling of the vehicle body 1. In the case of the coordinated traveling work shown in FIG. 1, the first work vehicle functions as a "master work vehicle", whereas the second work vehicle and the third work vehicle function respectively as "slave work vehicles". As the respective work vehicles travel with their traveling paths slightly overlapped with each other, it is possible to carry out a traveling work with a working width almost three times as that of the traveling work possible by a single work vehicle.

In the FIG. 1 embodiment, the traveling path of the master work vehicle in the work field is set in advance of the traveling work; and each work vehicle is operated/driven automatically or manually from a predetermined traveling work starting point. In this embodiment, it is assumed that the master work vehicle is maneuvered manually and the slave work vehicles are maneuvered automatically. Namely, based on the traveling path of the master work vehicle, target traveling paths for the respective slave work vehicles will be calculated and the slave work vehicles will be maneuvered such that their traveling paths may agree with such target traveling paths. A method of the automatic maneuvering is described in details in the above-cited Patent Literature 1 and Japanese Unexamined Patent Application Publication No. 2014-178759 (JP 2014-178759 A).

Before each work vehicle arrives at the traveling work starting point in the work field or starts the traveling work after arriving at the traveling work starting point, traveling work parameter setting operations by the parameter setting unit PU and the coordination management unit CU are effected.

The parameter setting unit PU included in each work vehicle includes a traveling work parameter setting section 41. The traveling working parameter setting section 41 sets a traveling work parameter that is to specify (define) the traveling work by the work vehicle. Such set traveling work parameter will then be forwarded to the coordination management unit CU via data communication between a communication processing section 71 in the parameter setting unit PU and a communication processing section 72 in the coordination management unit CU. The coordination management unit CU includes a traveling work parameter acquisition section 42 and a difference data generation section 43.

The traveling work parameter acquisition section 42 acquires a traveling work parameter set by the parameter setting unit PU of each work vehicle. If a difference exists among/between the traveling work parameters of the respective work vehicles acquired by the traveling work parameter acquisition section 42, the difference data generation section 43 will generate difference data indicative of such difference for each work vehicle. The traveling work parameter difference among/between the respective work vehicles is detected in various methods. One example thereof is a method in which a traveling work parameter set by a particular work vehicle is used as a "reference value" and it is determined that a difference exists in case there is deviation exceeding an allowable range from such reference value. Another example method is a method in which a value preset for a traveling work to be carried out is used as a "reference value" and it is determined that a difference exists in case there is deviation exceeding an allowable range from such reference value. The generated difference data will be forwarded to the parameter setting unit PU of the subject work vehicle. The parameter setting unit PU includes an informing section 56. The informing section 56 informs contents of the received difference data via visual or auditory means. Based on such information contents, the driver or the managing person of the work vehicle can reset the traveling work parameter that requires correction.

The resetting of the traveling work parameter based on the difference data can be effected automatically. To this end, in the embodiment as shown in FIG. 1, the coordination management unit CU is equipped with a conforming data generating section 44; and the parameter setting unit PU of each work vehicle is equipped with a parameter correction section (shown in short as "P correction section" in the FIG. 45. The conforming data generation section 44 generates conforming data for conforming (resolving or eliminating) difference in the traveling work parameters of the respective work vehicles. When the generated conforming data is forwarded to the parameter setting unit PU of the subject work vehicle, based on the conforming data, the parameter correction section 45 will correct the traveling work parameter that requires correction, whereby the traveling work parameter will be reset.

In the embodiment as shown in FIG. 1, the parameter setting unit PU is further equipped with an individual correction section 46. It sometimes happens that a traveling work result that is expected from a set traveling work parameter may differ from a traveling work result that is calculated from detection data after actual execution of the traveling work. As such difference occurs for each work vehicle, correction of the traveling work parameter to resolve the difference needs to be effected individually for each work vehicle. Thus, the individual correction section 46 calculates an individual correction value for resolving the difference and gives the individual correction value to the traveling work parameter setting section 41. Then, the traveling work parameter setting section 41 will incrementally or decrementally adjust the set traveling work parameter by the individual correction value and gives the resultant incrementally/decrementally adjusted traveling work parameter to the subject controlled actuator device.

In the work vehicle coordination system described above with reference to FIG. 1, the coordination management unit CU can be built outside the work vehicle (for example, in a management computer installed at a management center, or in a data-communicative computer/smartphone that is carried by a driver or a monitoring person who monitors the traveling work based on the work vehicle coordination system). Instead thereof, in case the plurality of work vehicles are divided into a master work vehicle and slave work vehicle(s), the coordination management unit CU can be built in the control unit of the master work vehicle, together with the parameter setting unit PU; and FIG. 2 schematically shows one example thereof.

Figure 2:
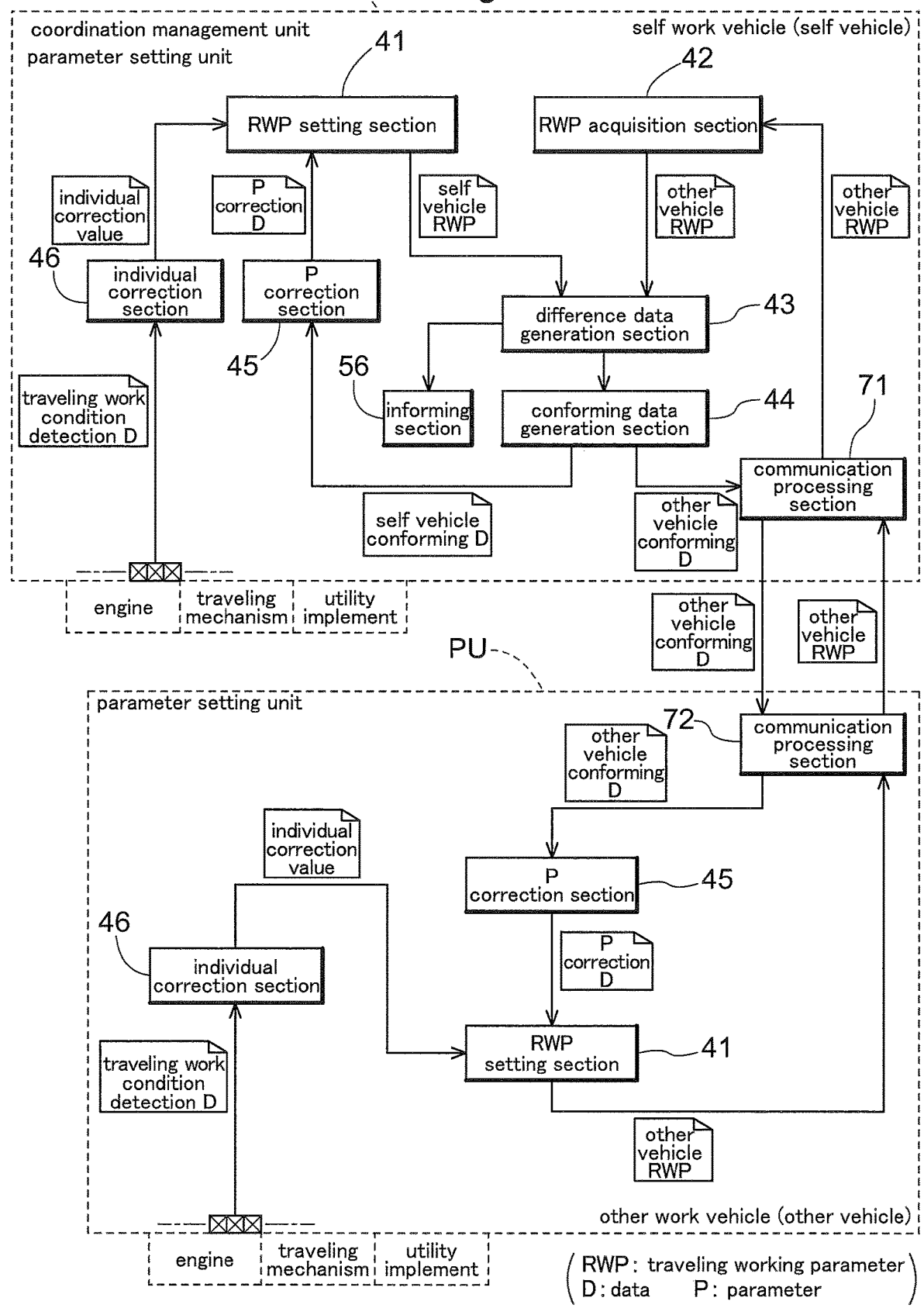
FIG. 2 is another diagram for describing a basic flow of traveling work parameter setting control in another work vehicle coordination system comprising a master work vehicle and a slave work vehicle.
Figure 3:
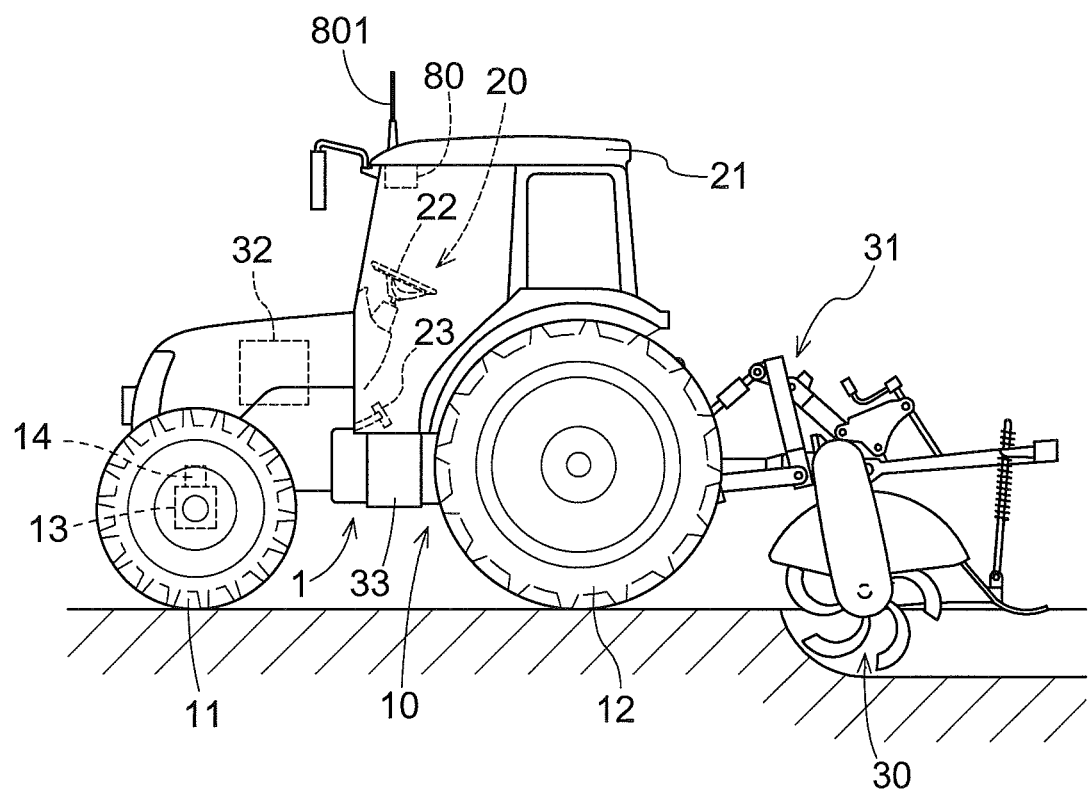
FIG. 3 is a side view of a tractor mounting a cultivator device, showing one embodiment of a work vehicle in the work vehicle coordination system.

In FIG. 2, for the sake of convenience of explanation, the master work vehicle is referred to as a "self work vehicle" or a "self vehicle", whereas the slave work vehicle is referred to as "other work vehicle" or "other vehicle". The coordination management unit CU and the parameter setting unit PU are built in the control unit of the self vehicle includes, whereas the parameter setting unit PU is built in the control unit of the other vehicle includes.

The self work vehicle includes the traveling work parameter setting section 41, the traveling work parameter acquisition section 42, the difference data generation section 43, the conforming data generation section 44, the parameter correction section 45 and the individual correction section 46. The traveling work parameter setting section 41 in the self work vehicle sets a traveling work parameter for the self work vehicle. The traveling work parameter acquisition section 42 of the self vehicle acquires the traveling work parameters set in the other work vehicles via their respective communication processing sections 71, 72. The other work vehicle too is provided with the traveling work parameter setting section 41, the parameter correction section 45 and the individual correction section 46. The traveling work parameter setting section 41 in the other work vehicle has a function of forwarding the set traveling work parameter to the self work vehicle as "other vehicle traveling work parameter".

The difference data generation section 43 in the self vehicle generates difference data indicative of a difference if any between the self vehicle traveling work data set at the traveling work parameter setting section 41 and the other vehicle traveling work parameter forwarded from the other work vehicle. The conforming data generation section 44 generates conforming data for conforming (resolving/eliminating) such difference indicated by the difference data. The conforming data generation section 44 can incorporate the function of the difference data generation section 43. As methods for conforming difference between self vehicle traveling work data and other vehicle traveling work data, there are a method of adjusting the self vehicle traveling work data, a method of adjusting the other vehicle traveling work data, a method of adjusting the traveling work data of both the self work vehicle and the other work vehicle, etc. Although such method can be determined in advance, it is also possible to formulate a rule for allowing selection of any one conforming method, in accordance with the contents of the traveling work, the kind of the traveling work parameter the requires adjustment, the specification of each work vehicle, etc.

In the case of adjustment of the other vehicle traveling work parameter, other vehicle conforming parameter will be generated and then forwarded to the parameter correction section 45 in the other work vehicle at issue. In the case of adjustment of the self vehicle traveling work parameter, self vehicle conforming parameter will be generated and then forwarded to the parameter correction section 45 in the self work vehicle. The functions of the parameter correction section 45 and the individual correction section 46 are as described hereinbefore with reference to FIG. 1.

Basically, the other work vehicle will be controlled in coordination to suit the traveling work parameter set at the self work vehicle. On the other hand, depending on the traveling work parameter relating to a certain unique specification of a particular work vehicle, it may be more advantageous to employ an individual setting for each work vehicle. In such case, when difference between the self vehicle traveling work parameter and the other vehicle traveling work parameter is to be conformed (resolved), a predetermined traveling work parameter may be provided with a "self vehicle priority mode" which gives/places priority on conforming on the part of the self vehicle, and an "other vehicle priority mode" which gives/places priority on conforming on the part of the other vehicle. Namely, depending on a type/kind of the traveling work parameter, either one of the priority modes will be selected.

Next, one embodiment of a specific embodiment of a work vehicle relating to the present invention will be described. In this embodiment, the work vehicle is configured as a tractor for carrying out an agricultural work such as a cultivating work on a field (work field) delimited by ridges or the like. The tractor includes a vehicle body 1 supported by front wheels 11 and rear wheels 12 together constituting a traveling mechanism 10. At a front portion of the vehicle body 1, an engine 32 is mounted; and at a rear portion of the vehicle body 1, a utility implement 30, which is a rotary cultivator herein, is mounted via a hydraulic lift mechanism 31. At a center portion of the vehicle body 1, there is formed a maneuvering section 20. The traveling mechanism 10 further includes a transmission 33 having a stepless speed changer for transmitting engine power to the front wheels 11 and the rear wheels 12. The front wheels 11 function as steering wheels, so that by changing their steering angle, a traveling direction of the tractor is changed. The steering angle of the front wheels 11 is changed by an operation on a steering mechanism 13. The steering mechanism 13 includes a steering motor 14 for automatic steering. At time of manual traveling, the steering of the front wheels 11 is made possible by an operation on a steering wheel 22 disposed at the maneuvering section 20. The maneuvering section 20 includes operational tools such as a brake pedal 23 for carrying out traveling system operations, as well as operational tools for carrying out working system operations such as elevating/lowering operations of the lift mechanism 31.

In a cabin 21 of the tractor, there is provided a global positioning system (GPS) module 80 that is constituted by e.g. a global navigation satellite system (GNSS) module. Though not shown, a GPS antenna for receiving GPS signals or GNSS signals is mounted in a ceiling area of the cabin 21. Incidentally, the GPS module 80 can include an inertial navigation module incorporating a gyro acceleration sensor, a geomagnetic direction sensor, etc. in order to assist or supplement the GPS navigation. Needless to say, the inertial navigation module can be provided at a site different from the GPS module 80.

The tractor includes the stepless speed changer of mechanical hydraulic type or hydrostatic type included in the transmission 33. With such stepless speed changer, in response to an operation of a speed changer lever from its neutral (stop) position, vehicle speed can be increased on the forward traveling side or reverse traveling side. Conversely, in response to an operation of the lever during the traveling back to the neutral position, a large braking force will be provided for enhancing performance for stopping the vehicle body 1. To this end, upon input of a braking command to a traveling control section 51 in response to an operation on the brake pedal 23 or upon generation of a braking command at the time of automatic traveling, a control operation is executed for not only activating the brake, but also operating the stepless speed changer to the neutral position. In order to obtain an even larger braking force, it is also possible to operate the stepless speed changer to a reverse traveling position. Further, if the utility implement 30 can be shifted to a posture position that increases traveling resistance, an operation for shifting the utility implement 30 to such posture position for obtaining such enhanced braking force will be effective at time of emergency stop. For instance, such control will be one for increasing the cultivation depth in the case of a cultivator. Further, in case there is provided a front wheel accelerating function for driving the front wheels 11 at a higher speed than the rear wheels 12, the braking force can be obtained also by switching to such front wheel acceleration mode. Provision of such special or enhanced braking force will be suitable in particular at time of off-road traveling or an emergency stop at time of automatic traveling.

Figure 4:
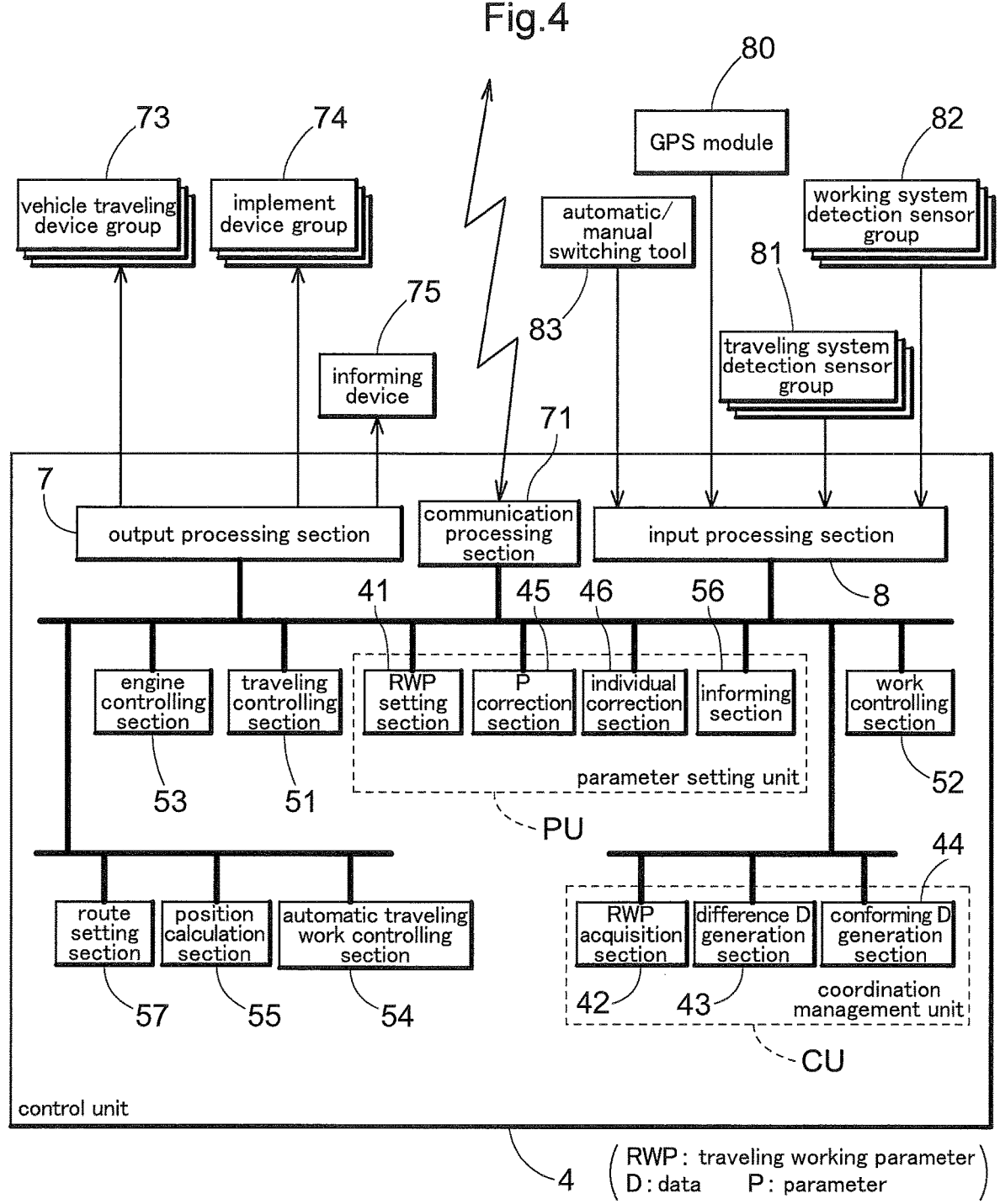
FIG. 4 is a functional block diagram for describing a control system of the tractor.

FIG. 4 shows a control system of the tractor configured to function as a master work vehicle in the work vehicle coordination system such as the one shown in FIG. 2. The control unit 4 which is the core component of this control system includes an output processing section 7, an input processing section 8 and a communication processing section 71, which sections function as an input/output interface. The output processing section 7 is connected to a vehicle traveling device group 73, an implement device group 74, an informing device 75, etc. The vehicle traveling device group 73 includes control devices relating to vehicle traveling, e.g. an engine controller, a speed changer controller, a braking controller, a steering controller, etc. The implement device group 74 includes a power controller for the utility implement 30 which is a rotary cultivator in this embodiment, a lift cylinder controller for the lift mechanism 31 for lifting up/down the utility implement 30, etc. The communication processing section 71 has function of exchanging data between the master work vehicle and the outside. Here, the "outside" of the master work vehicle includes the control system of the tractor which serve as a slave work vehicle in the work vehicle coordination system, the management computer built in the remotely disposed management center, a mobile communication terminal of the driver or the monitoring person. The informing device 75 includes a flat display panel, a lamp and a buzzer, and informs the driver or the operator of various kinds of information desired to be informed in visual or auditory form. Signal transmission between the informing device 75 and the output processing section 7 is effected in either wired or wireless manner.

The input processing section 8 is connected to the GPS module 80, a traveling system detection sensor group 81, a working system detection sensor group 82, an automatic/manual switching operation tool 83, etc. The traveling system detection sensor group 81 includes sensors for detecting operational tool states such as an engine rotational speed, a speed change position, etc., and sensors for detecting a position of e.g. the brake pedal 23 and an accelerator pedal. The working system detection sensor group 82 includes sensors for detecting a position or a tilting of the utility implement 30, a sensor for detecting work load, etc. The automatic/manual switching operation tool 83 is a switch for selecting either an automatic traveling mode for traveling by automatic steering and a manual steering mode for traveling by the manual steering. For instance, if the automatic/manual switching operation tool 83 is operated during traveling in the automatic steering mode, switchover is made to traveling by the manual steering. Conversely, if the automatic/manual switching operation tool 83 is operated during traveling in the manual steering mode, switchover is made to traveling by the automatic steering.

The coordination management unit CU and the parameter setting unit PU described above with reference to FIG. 2 are included in this control unit 4. As the contents thereof are substantially identical, explanation thereof will be omitted here. In addition to them, the control unit 4 includes the travel controlling section 51, a work controlling section 52 and an engine controlling section 53. The travel controlling section 51 controls the vehicle traveling device group 73 for effecting operations relating to traveling, such as an actuator of the traveling mechanism 10. The work controlling section 52 controls the implement device group 74 for effecting operations relating to the utility implement 30, such as an actuator of the utility implement 30. The engine controlling section 53 controls an actuator of the engine 32.

Further, the tractor is capable of traveling under both automatic traveling (automatic steering) and manual traveling (manual steering). Therefore, the control unit 4 further includes an automatic traveling work control section 54. In the automatic traveling by the automatic traveling control section 54, traveling is done along a preset target traveling route. Therefore, the control unit 4 includes a position calculation section 55, and a route setting section 57 for setting a target traveling route. The position calculation section 55 calculates the position of the vehicle body 1 or the position of the utility implement 30, based on positioning data sent sequentially from the GPS module 80. The automatic traveling work control section 54 calculates orientation or position deviation between the target traveling route and the self vehicle position, and generates an automatic steering command, and then outputs the automatic steering command via the output processing section 7 to the steering motor 14 (see FIG. 2) included in the vehicle traveling device group 73.

In case traveling work is carried out manually, too, an engine rotational speed, a vehicle speed, a utility implement position, a posture of the utility implement 30 (cultivation depth), etc. will be set automatically via the traveling work parameters that are set by the traveling work parameter setting section 41 of the parameter setting unit PU, without requiring adjustments made by the driver's operations on the corresponding operational tools. Also, in the case of automatic traveling in a traveling work in which straight traveling and turn traveling (U-turn traveling, L-turn traveling, etc.) are effected in repetition, the starting position and the ending position of the turning traveling, too, can be set automatically via the traveling work parameter.

The control system of the tractor, configured to function as a slave work vehicle in the work vehicle coordination system such as the one shown in FIG. 2, has a configuration substantially identical to a configuration obtained by omitting the coordination management unit CU from the configuration of the control unit 4 shown in FIG. 4. However, as a certain tractor can function selectively as either a master work vehicle or a slave work vehicle, as needed or appropriate depending on the situation, it will be advantageous for the actually implemented tractor to be provided with the configuration of the control unit 4 shown in FIG. 4.

Figure 5:
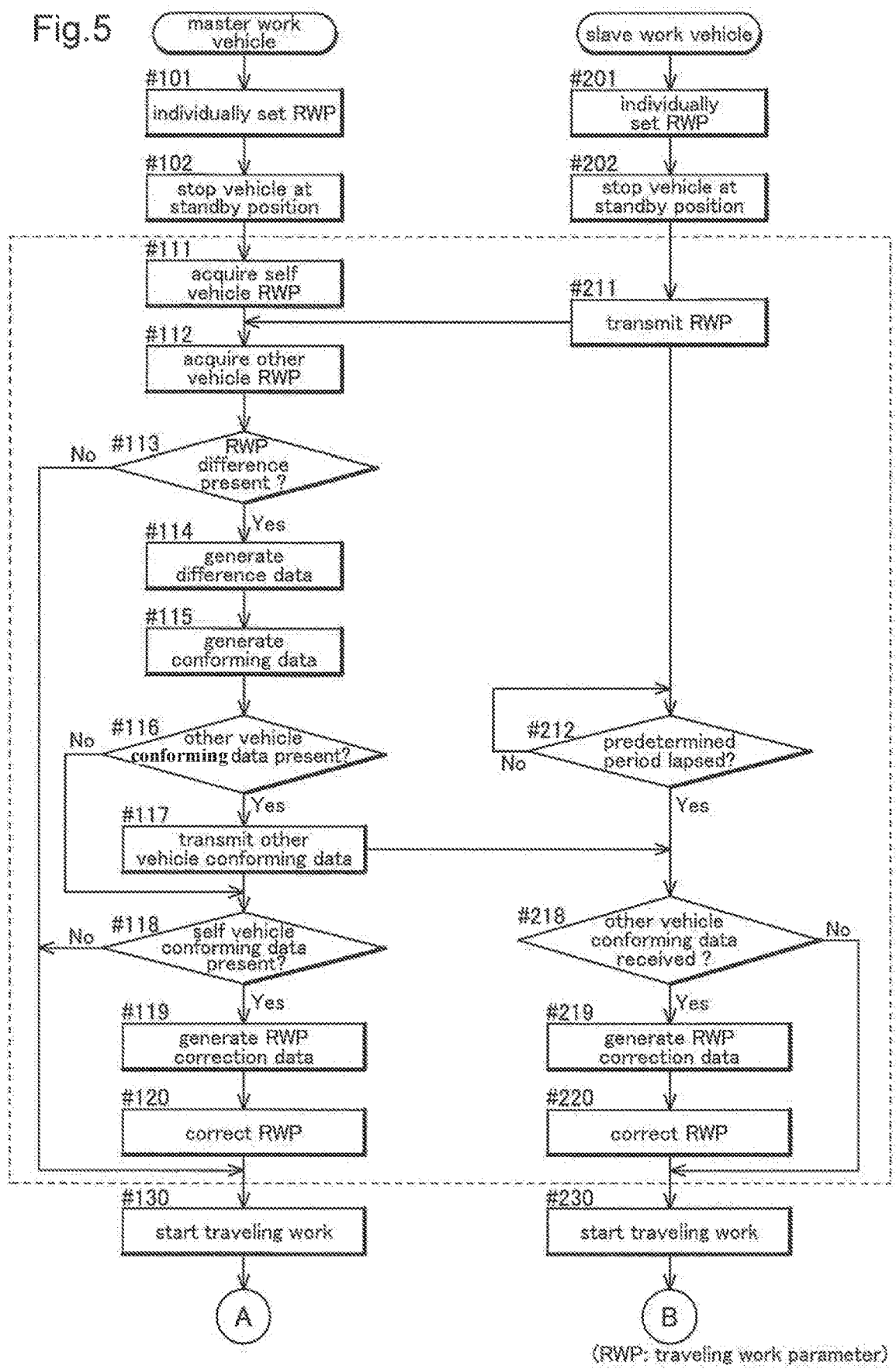
FIG. 5 is a flowchart showing one example of traveling work parameter setting control in a master work vehicle and a slave work vehicle, which follows suit with the master work vehicle, when the master work vehicle and the slave work carry out a coordinated traveling work in a same work field.
Figure 6:
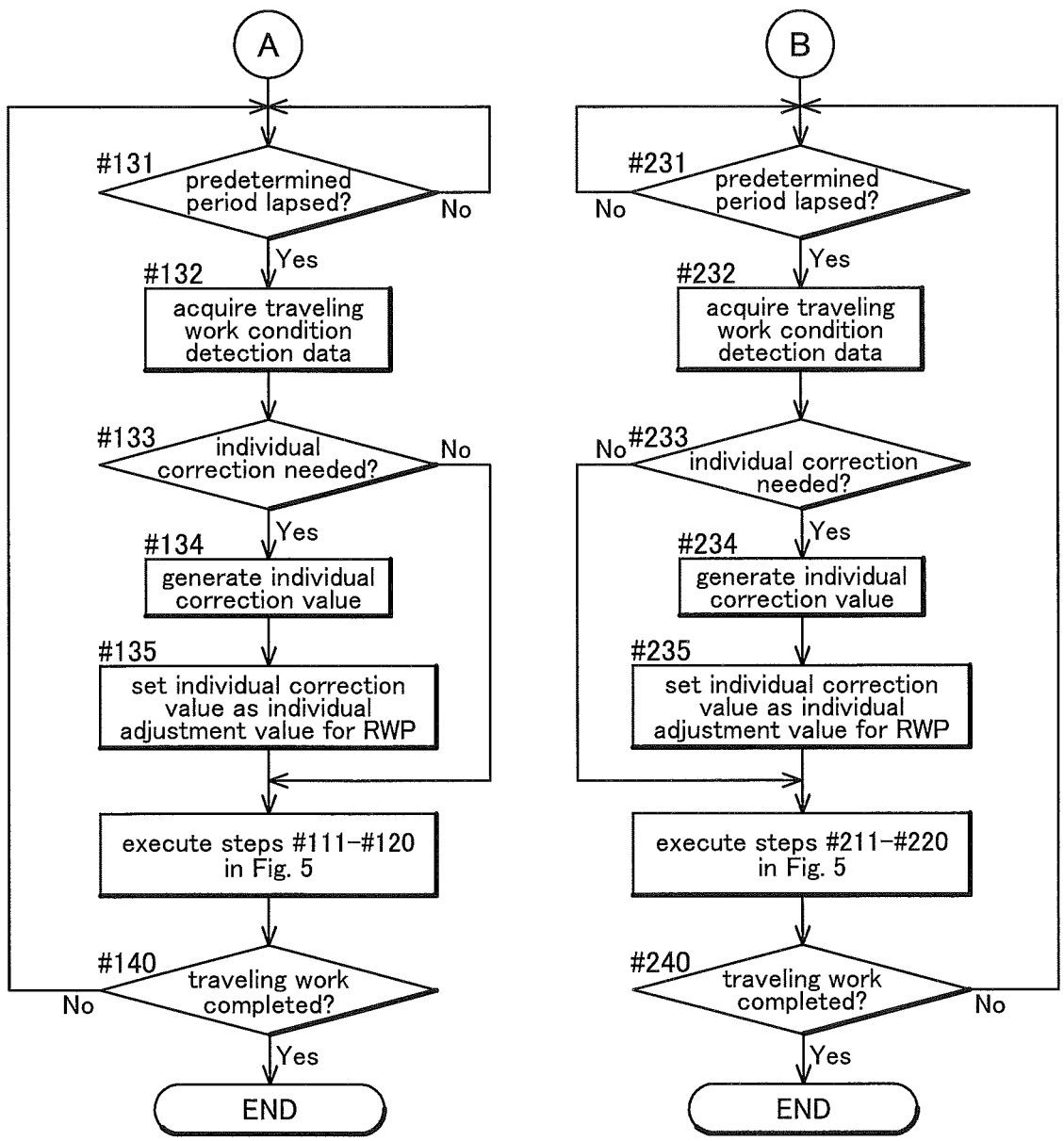
FIG. 6 is a flowchart showing the one example of traveling work parameter setting control in a master work vehicle and a slave work vehicle, which follows suit with the master work vehicle, when the master work vehicle and the slave work carry out a coordinated traveling work in a same work field.

With reference to a flowchart shown in FIG. 5 and FIG. 6 next, description will be made about an example of traveling work parameter setting control for a master work vehicle and a slave work vehicle, which follows suit with this master work vehicle, when the master work vehicle and the slave work carry out a coordinated traveling work in a same field.

Before the traveling work is started, at both vehicles (the master work vehicle and the slave work vehicle), traveling work parameters are set individually (#101; #201). As such traveling work parameters to be set, it is possible to employ a vehicle speed, a speed position, an engine rotational speed, a cultivation depth, a work load range, an engine load range, a work starting position, a temporary stop position, a U-turn traveling condition, etc. Both vehicles will make temporary stop at respective standby positions before the traveling work (#102; #202).

Thereafter, parameter check correction process will be effected in a manner as follows (#111-#120; #211-#220). The parameter check correction process is a process for checking their traveling work parameters in and between the master work vehicle and the slave work vehicle, and correcting the parameters if necessary.

Firstly, on the slave work vehicle side, the self vehicle traveling work parameter will be read out and then transmitted to the master work vehicle (#211). On the master work vehicle side, the self vehicle traveling parameter set in this vehicle will be read out and given to the difference data generation section 43 (#111) and also the self vehicle traveling work parameter received from the slave work vehicle will also be given to the difference data generation section 43 (#112). Then, the difference data generation section 43 will check if there exists any difference between the traveling work parameters of the master work vehicle and the slave work vehicle (#113). If a difference exists (YES branching at #113), the difference data generation section 43 will generate difference data and give the difference data to the conforming data generation section 44 (#114). Then, the conforming data generation section 44 will generate conforming data for resolving such difference (#115). Then, the conforming data generation section 44 will check whether the produced conforming data contains other vehicle confirming data which is to constitute a correction request to the slave work vehicle or not (#116). If such other vehicle conforming data is contained (YES branching at #116), the conforming data generation section 44 will transmit the other vehicle conforming data to the slave work vehicle via the communication processing section 71 (#117). Further, the conforming data generation section 44 will check whether the produced conforming data contains self vehicle confirming data which is to constitute a correction request to the master work vehicle (self work vehicle) or not (#118). If such self vehicle conforming data is contained (YES branching at #118), the parameter correction section 45 will generate parameter correction data from the self vehicle conforming data (#119). The traveling work parameter setting section 41 will acquire the generated parameter correction data, and then correct and reset the traveling work parameter at issue (#120). On the other hand, if no difference exists between the traveling work parameter of the master work vehicle and the traveling work parameter of the slave work vehicle (NO branching at #113), the parameter check correction process on the master work vehicle side will be ended. Similarly, if no self vehicle conforming data is contained in the confirming data generated by the confirming data generation section 44 (NO branching at #118), the parameter check correction process on the master work vehicle side will be ended.

On the slave work vehicle side, after the self vehicle traveling work parameter is transmitted to the master work vehicle at step #211, the process will await lapse of a predetermined period (#212). This predetermined period is a period for coping with possible data generation process in case generations of the difference data and the conforming data have been effected on the master work vehicle side. The process will check whether the slave work vehicle has received the other vehicle confirming data or not (#218). If the slave work vehicle has received such data (YES branching at #218), the parameter correction section 45 on the slave work vehicle side will generate parameter correction data from the other vehicle conforming data (#219). Further, based on the parameter correction data, the traveling work parameter setting section 41 will correct and reset the traveling work parameter (#220). With this, the parameter check correction process on the slave work vehicle side will be ended. On the other hand, if the slave work vehicle has not received the other vehicle conforming data (NO branching at #218), the parameter check correction process on the slave work vehicle side will be ended at this point.

Upon ending of the parameter check correction processes, each of the master work vehicle and the slave work vehicle will start its own traveling work (#130; #230). Upon starting of the traveling work, as shown in FIG. 6, substantially same process will be effected in the master work vehicle and the slave work vehicle. Firstly, upon lapse of a predetermined period (YES branching at #131; YES branching at #231), namely, upon lapse of a predetermined sampling time, traveling condition detection data will be acquired from the traveling system detection sensor group 81 and the working system detection sensor group 82 (#132; #232). The individual correction section 46 will calculate implementation result of the traveling work from the acquired traveling work condition detection data, and proceed to compare it with a traveling work result expected from the set traveling work parameter for evaluation. Then, if it is found that there is a need for some incremental/decremental adjustment of the traveling work parameters individually (YES branching at #133; YES branching at #233), the individual correction section 46 will calculate an individual correction value for such adjustment (#134; #234). Incidentally, the individual correction value thus calculated will be given to the traveling work parameter setting section 41. The traveling work parameter setting section 41 will give the traveling control section 51 or the working control section 52 the traveling work parameter incrementally/decrementally adjusted in accordance with the individual correction value. On the other hand, even for a traveling work parameter assigned with an individual correction value, the traveling work parameter setting section 41 will give the difference data generation section 43 the traveling work parameter not incrementally/decrementally adjusted. This is because the traveling work parameters of the plurality of work vehicles would not be conformed appropriately to each other if a traveling work parameter adjusted due to some reason unique to each (specific) individual work vehicle were employed.

Subsequently, the parameter check correction processes (#111-#120; #211-#220) shown in FIG. 5 will be effected. If there was no need for incremental/decremental adjustment of the traveling work parameter (NO branching at #133; NO branching at #233), the parameter check correction processes will be effected immediately. Upon completion of the parameter check correction processes, the process will then check whether the traveling work has been completed or not (#140; #240). If it is found that the present traveling work is still going on (NO branching at #140; NO branching at #240), the process will return to step #131 in the case of the master work vehicle, whereas the process will return to step #213 in the case of the slave work vehicle.

Other Embodiments (1) In the foregoing embodiment, as a work vehicle, there was cited a tractor mounting a rotary cultivator as the work implement 30. However, aside such tractor, the work vehicle can be embodied as other various kinds of work vehicles such as an agricultural vehicle such as a rice planter, a fertilizer, a combine, or a work vehicle such as a civil engineering vehicle having a dozer, a roller, etc. as the utility implement 30.

(2) The respective functional sections shown in the functional block diagrams shown in FIG. 1, FIG. 2 and FIG. 4 are sectioned mainly for the sake of description. In actuality, however, the respective functional sections can be combined or can be further divided into sub sections, if necessary.

(3) In the foregoing embodiment, in a traveling work in one work field, it was assumed that same settings are maintained for the traveling work parameters. However, the traveling work parameters may be changed and reset for each area of the work field. With this, even if the slope of the ground surface, the hardness of the ground surface, or growth situation of agricultural produce in a farm field may differ depending on the location of the work field, such difference can be coped with appropriately.

INDUSTRIAL APPLICABILITY

The present invention is applicable to a traveling work which is carried out by a plurality of work vehicles traveling and working in coordination with each other. In particular, the invention is suitably applicable to a coordination work vehicle system in which a slave work vehicle is maneuvered automatically along a target traveling route calculated based on a traveling path of a master work vehicle and also to a work vehicle used in such system.

DESCRIPTION OF REFERENCE MARKS/NUMERALS

1: vehicle body
4: control unit
10: traveling mechanism
13: steering mechanism
14: steering motor
20: maneuvering section
30: utility implement
41: traveling work parameter setting section
42: traveling work parameter acquisition section 43: difference data generation section
44: conforming data generation section
45: parameter correction section
46: individual correction section
51: traveling control section
52: work controlling section
53: engine controlling section
54: automatic traveling work controlling section
55: position calculation section
56: informing section
71: communication processing section
72: communication processing section
75: informing device
80: GPS module
81: traveling system detection sensor group
82: working system detection sensor group
83: automatic/manual switching operation tool
CU: coordination management unit
PU: parameter setting unit

What is claimed is:

1. A work vehicle coordination system configured to manage a coordinated traveling work carried out by a plurality of work vehicles in coordination in a work field, the system comprising:
a traveling work parameter setting section included in each work vehicle for setting a traveling work parameter to define a traveling work of each work vehicle;
a communication processing section for effecting data communication between/among the plurality of work vehicles;
a traveling work parameter acquisition section for acquiring the traveling work parameter set in each work vehicle;
a difference data generation section for generating difference data indicative of a difference between/among the traveling work parameters set in the respective work vehicles and determining whether the generated difference data is within an allowable range; and
an informing section for informing the difference data when the generated difference data is outside the allowable range.

2. The work vehicle coordination system according to claim 1, further comprising:
a conforming data generation section for generating conforming data for conforming the difference in the traveling work parameters of the respective work vehicles, the subject traveling work data being corrected based on the conforming data.

3. A work vehicle configured to carry out a traveling work in a same work field as other work vehicle which work in coordination therewith, the work vehicle comprising:
a utility implement for carrying out a ground work with traveling of the work vehicle;
a traveling work parameter setting section for setting a traveling work parameter that specifies the traveling work as a self vehicle traveling work parameter;
a communication processing section for effecting data communication with the other work vehicle;
a traveling work parameter acquisition section for acquiring an other vehicle traveling work parameter which is a traveling work parameter set in the other work vehicle;
a difference data generation section for generating difference data indicative of a difference between the self vehicle traveling work parameter and the other vehicle traveling work parameter, and determining whether the generated difference data is within an allowable range;
a conforming data generation section for generating self vehicle conforming data for conforming the difference on the side of the self vehicle; and
a parameter correction section for correcting the self vehicle traveling work parameter based on the self vehicle conforming data when the generated difference data is within the allowable range.

4. The work vehicle of claim 3, wherein
when a difference between the self vehicle traveling work parameter and the other vehicle traveling work parameter is to be conformed, depending on a type of the traveling work parameter, selection is made possible between a self vehicle conforming priority mode which places priority on conforming on the part of the self vehicle, and an other vehicle conforming priority mode which places priority on conforming on the part of the other vehicle.

5. The work vehicle of claim 3, further comprising:
a position calculation section for calculating a self vehicle position based on positioning data from a GPS module,
wherein the traveling work parameter can be set for each area of a plurality of areas which altogether constitute the work field.

6. The work vehicle of claim 3, further comprising:
an individual correction section configured to calculate an individual correction value for correcting the traveling work parameter for each individual work vehicle, based on a result of the traveling work by the set traveling work parameter.

7. The work vehicle of claim 4, further comprising:
a position calculation section for calculating a self vehicle position based on positioning data from a GPS module,
wherein the traveling work parameter can be set for each area of a plurality of areas which altogether constitute the work field.

8. The work vehicle of claim 4, further comprising:
an individual correction section configured to calculate an individual correction value for correcting the traveling work parameter for each individual work vehicle, based on a result of the traveling work by the set traveling work parameter.

9. The work vehicle of claim 5, further comprising:
an individual correction section configured to calculate an individual correction value for correcting the traveling work parameter for each individual work vehicle, based on a result of the traveling work by the set traveling work parameter.

10. The work vehicle of claim 3, wherein
the conforming data generation section also generates other vehicle conforming data on the side of the other work vehicle for conforming the difference between the self vehicle traveling work parameter and the other vehicle traveling work parameter, and
the other work vehicle includes an other work vehicle parameter correction section that corrects the other vehicle traveling work parameter based on the other vehicle conforming data when the generated difference data is within the allowable range.

* * * * *